(No Model.)

R. S. WARING.
ELECTRIC CABLE.

No. 290,375. Patented Dec. 18, 1883.

Witnesses.
R. H. Whittlesey
C. M. Clarke

Inventor: Richard S. Waring
By Attorney George H. Christy

UNITED STATES PATENT OFFICE.

RICHARD S. WARING, OF PITTSBURG, PENNSYLVANIA.

ELECTRIC CABLE.

SPECIFICATION forming part of Letters Patent No. 290,375, dated December 18, 1883.

Application filed January 29, 1883. (No model.) Patented in England November 29, 1882, No. 5,673; in France November 29, 1882, No. 152,367; in Belgium November 30, 1882, No. 59,707; in Austria-Hungary February 13, 1883, No. 40,898, and in Spain June 18, 1883, No. 2,920.

*To all whom it may concern:*

Be it known that I, RICHARD S. WARING, a citizen of the United States, residing at Pittsburg, county of Allegheny, State of Pennsylvania, have invented or discovered a new and useful Improvement in Electric Cables; and I do hereby declare the following to be a full, clear, concise, and exact description thereof, reference being had to the accompanying drawings, making a part of this specification, in which—like letters indicating like parts—

Figure 2:
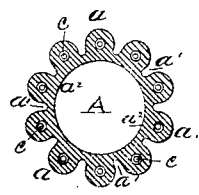
Figure 1:
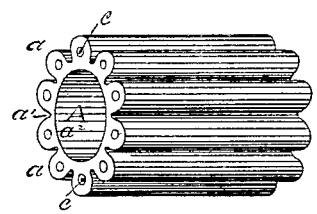
Figure 4:
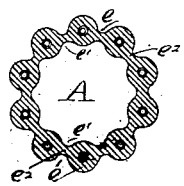
Figure 3:
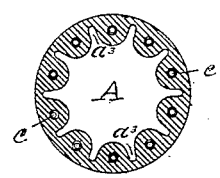

Figure 1 is a perspective view of my improved cable. Fig. 2 is a transverse sectional view of the same; and Figs. 3 and 4 are sectional views illustrative of certain modifications in form and construction, as hereinafter described.

My invention relates to lead-armored electric cables; and it consists, in general terms, of a cable having a tubular body of lead or other equivalent soft ductile metal or alloy, with raised ribs and intermediate depressions or grooves on its surface, and having a single circle of insulated electric conductors inclosed in tubular passages in the surface-ribs, with reference to securing flexibility, and also making provision for subdivision of the cable at its ends into a number of separate lead-armored strands or conductors, as hereinafter more fully described and claimed.

It is an important feature in cables designed for use under ground or in water, and especially in that class having two or more insulated conductors inclosed within separate tubular passages in a common body of metal, that provision be made in form and construction for affording the greatest attainable degree of flexibility, so that the cable may be bent, reeled, straightened, twisted, and otherwise manipulated without injury to the insulation or the conducting properties of the separate wires; also, that provision be made for dividing the metal body longitudinally between wires into separate strands containing one or more insulated and armored conductors, with reference either to leading off branches or forming terminal connections. The purpose of my present invention is to secure these advantageous features of form and construction in what are known in the art as "lead-covered" cables to a greater degree than has heretofore been attained, and also to secure economy in the use of lead, lightness, and strength. These last-mentioned features of advantage are best secured in what are known as "round" cables; and my invention has reference, more particularly, to cables of this form, which employ lead or an equivalent soft ductile metal or alloy for an armor or covering and protecting metal.

In forming my improved cable, I make use of a machine known in the art as a "lead-press," in which the insulated wires are passed through a tubular core or mandrel, and through a shaping and pressing die, and the lead is forced under pressure from the cylinder through the die and onto and around the wires, enveloping them in separate passages within a common body of metal at one time and at one operation. Machines adapted to do this work are well known in the art, and therefore need not be shown or described in detail. In forming the cable in this way, I make a tubular body of lead or equivalent metal, A, with longitudinal ribs $a$, by preference, on its outer surface, separated by intermediate grooves or depressions, $a'$. Each of these ribs is also tubular, and incloses an insulated conducting-wire, $c$. The cable thus formed may be described as consisting of a number of singly-insulated and lead-armored wires arranged or combined in a single circle about a common axial center, and connected on their inner sides into a single compound cable by a comparatively light or thin annular or pipe-like body of lead, $a^2$. In making such cables the lead is applied to the insulated wires at comparatively high temperature—say about 300° Fahrenheit. This degree of heat is sufficient to melt the insulating compound with which the wires are coated, and to keep it in liquid condition for a considerable time after the cable leaves the press. It is also customary to wind the cable, as it is delivered from the press, on reels or in coils of, say, two feet in diameter, for convenience in subsequent handling. Such bending or coiling while the lead is hot and more or less plastic has in round cables a marked tendency to flatten the tubular wire-passages, thereby displacing the liquid insulating material, and bringing the wire into dangerous proximity to the lead wall, unless provision is made for relieving the compressing strains imposed upon the wire-passages in bending by a ready or easily-effected change of form of the cable as a whole. This is accomplished in my improved cable in part by its tubular form. In bending such a tube, much of the surface strain may be relieved by flattening, especially if the tube be light, thus reducing the main tubular passage, giving it an oval or elliptical form. A familiar illustration of this action is found in the manufacture of light lead pipe, where in coiling the pipe is materially flattened. If the cable had a solid core, this flattening tendency would be resisted by the inner solid body. Consequently the strain would react upon and tend strongly to flatten the small wire-passages. By making the cable with hollow interior, the tube as a whole is flattened, and the wire-passages are in a measure relieved. This tubular form will not alone, however, afford all the relief desired, and to supplement its action I combine with it the ribbed and grooved form of exterior. These ribs and grooves co-operate with the hollow or tubular form of the body in several ways to secure the desired protection to the wires and their insulation. For example, the grooves, being sunk within the outer circle of the wire-passages, reduce, in effect, the thickness of the tube-wall $a^2$ below what would be required to cover the wires by a plain pipe form, such as heretofore used, because the thin parts or lines along the bottom of the grooves afford easy bending planes or points, and the thickness of the tube-wall $a^2$ along these lines practically measures or determines the force required to bend or flatten the cable as a whole. This is much less than would be required if the tube were not grooved. The resistance to bending force in a plain ungrooved cable is necessarily in a great measure transmitted through or exerted upon the walls of the wire-passages; but by grooving the exterior this resistance is effective mainly in the remaining ungrooved wall $a^2$. Consequently the ribs $a$, which carry the wires, are largely relieved, and the force exerted upon each of them is but little more than would be required to bend them if entirely separate from the common connecting body of metal. This desirable result is secured to a much greater degree by the conjoint action of the hollow tubular form of interior and ribbed and grooved form of exterior.

Another advantage or element of security against injury to the wires or their insulation is the facility of adjustment afforded between the several ribs, as required by change of form of the cable as a whole. For example, in bending and flattening, the ribs which carry the wires can approach each other or separate, as the change in form may incline them, the wall $a^2$ bending for this purpose in longitudinal lines along the bottoms of the grooves $a'$, the wall between the grooves being bent little or none. The ribs can thus shift with relation to each other with such facility as practically to relieve them from the peculiar compressing strain which would be imparted by bending a solid round cable having similar grooved or ribbed exterior—such, for example, as is shown and described in Patent No. 268,060, granted to me November 28, 1882—because in such solid cable there would be no freedom or tendency to form longitudinal lines of bending along the bottoms of the grooves. The same is true of the form and construction of the cable shown and claimed in Patent No. 268,158, granted to me November 28, 1882, in which two concentric circles of wires are embedded in a tubular body, the inner circle being included within the tube wall proper, and the outer circle being inclosed in surface ribs. The thickness of pipe or tube wall requisite to contain this inner circle of wires and the rigidity imparted to it by this amount of metal and by the inclosed wires gives the cable, practically, the same resistance to bending and flattening as is possessed by the solid cable. There is practically no tendency in either of these prior forms to flatten by bending along the lines of the grooves, and neither contains the elements of form and construction nor secures the advantages obtained in my present invention, in which only a single circle of wires is employed, connected together into a single compound cable with a comparative thin wall of metal, whereby changes of form are made in the cable as a whole by bending or yielding. This tendency to relieve surface strain in bending by flattening or collapsing is characteristic, to any appreciable extent, only of light pipe forms. If the pipe-wall be heavy, as in Patent No. 268,158, above referred to, its stability of circular form or ability to resist compression is so great that in bending while the metal is hot and the insulating material is liquid, distortion will mainly take place on the surface by stretching and upsetting, thus directly affecting the wire-passages.

The protection afforded by my present improved form and construction is material and of great practical importance, not only in the manufacture and reeling of the cable in the first instance, as above described, but also in subsequent handling. It enables the cable to be bent and reeled while hot without danger of injury to the wires; also to be unreeled, bent in any and all directions, with short and repeated bending, twisted axially, so that the ribs run in quick spirals around the cable, and, in short, handled with substantially the same ease and freedom, making due allowance for weight, as a single-wire conductor, without any risk of injury therefrom.

The high degree of flexibility, with due regard to safety, secured by my improved cable, adds materially to its value for practical purposes of use.

Another important advantage resulting from the combination of tubular hollow interior and grooved exterior with a single circle of wire is the provision made thereby for subdividing a portion of the cable into a number of complete lead-armored strands or separate conductors for branching lines and terminal connections by radial cuts made along the bottoms of the grooves from the exterior to the interior surface. This can be done with great ease and facility without any danger of cutting into the wire-passages, the shell or wall $a^2$ being comparatively thin along the lines of the grooves. I do not, however, claim herein this method of subdividing a cable, nor a cable so divided, as the same, in so far as they contain patentable invention, will be included in the subject-matter of a separate application or applications for patents.

If desired, the interior tube-surface of the lead covering may be grooved between wires, as illustrated in Fig. 3 by the grooves $a^3$; or the tubular body may be grooved on both its exterior and interior surfaces, as illustrated in Fig. 4 by the grooves $e$ $e'$. These modified forms do not, however, secure all the advantages of the preferred form, Figs. 1 and 2, for the reasons that in the form Fig. 3 more lead is required to cover a given number of wires; also, the wires cannot be uncovered and reached, when desired, with the same facility and ease as with the exterior ribs and grooves; also, in the form Fig. 4 the connecting web of metal $e^2$ between the bases of the grooves is nearer the central circle of wires, and the forces exerted in flattening or bending the cable will be transmitted through and tend more directly and effectually to change the form of the wire-passages; also, the freedom of movement of ribs which carry the wires will be restricted to a considerable degree, though much more will remain than would be secured in a plain ungrooved pipe-like cable, owing to the tendency to bend in longitudinal lines along the grooves, which mark the weakest points or parts of the lead covering.

In the preferred form Figs. 1 and 2, having comparatively deep exterior grooves, $a'$, and plain light inner wall, $a^2$, the compression and expansion caused by flattening or bending is transmitted through the wall $a^2$, and in a great measure within or on the inner side of the circle of wires; also, the wire ribs are free to shift without restraint from intermediate side abutments, like the ribs $e^2$ in Fig. 4. Similar co-operative features of form and construction are present to some extent, however, in all the forms shown, and may also be employed in cables having still other modifications, which embody in substance a hollow tubular body with ribs and intermediate grooves carrying a single circle of wires, and such modifications I consider as coming within my invention.

I claim herein as my invention—

1. A compound electric cable having in combination a hollow tubular lead body or covering, with tubular ribs and intermediate grooves extending longitudinally thereon, carrying a single circle of insulated wires inclosed within the tubular rib-passages, the grooves extending in depth within the circle of or between the wires, substantially as described, whereby provision is made for flattening the cable by bending along such grooves, and for subdividing it into separate strands.

2. A compound electric cable having in combination a hollow tubular lead body or covering, with tubular ribs and intermediate grooves extending longitudinally on its exterior surface, carrying a single circle of insulated electric conducting-wires, inclosed within the tubular rib-passages, the inner connecting tube-wall being comparatively light and unoccupied with wires, substantially as and for the purposes set forth.

3. A flexible electric cable having in combination a hollow tubular body of lead, with tubular ribs $a$ on its exterior surface, intermediate grooves, $a'$, extending in depth within the outer circle of the rib-passages, and a light connecting-wall, $a^2$, on the inner side of the rib-passages, and a single circle of insulated wires, $c$, inclosed within such rib-passages, substantially as and for the purposes set forth.

In testimony whereof I have hereunto set my hand.

RICHARD S. WARING.

Witnesses:
  R. H. WHITTLESEY,
  C. L. PARKER.